(12) United States Patent
Yuan et al.

(10) Patent No.: US 10,361,923 B2
(45) Date of Patent: Jul. 23, 2019

(54) METHOD AND DEVICE FOR DISCOVERING NETWORK TOPOLOGY

(71) Applicant: Huawei Technologies Co., Ltd., Shenzhen (CN)

(72) Inventors: Yulin Yuan, Shenzhen (CN); Zhiming Ye, Shenzhen (CN); Xiaoji Fan, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 199 days.

(21) Appl. No.: 15/426,891

(22) Filed: Feb. 7, 2017

(65) Prior Publication Data
US 2017/0149619 A1 May 25, 2017

Related U.S. Application Data

(63) Continuation of application No. PCT/CN2015/086151, filed on Aug. 5, 2015.

(30) Foreign Application Priority Data

Aug. 12, 2014 (CN) .......................... 2014 1 0395691

(51) Int. Cl.
H04L 12/24 (2006.01)
H04L 12/751 (2013.01)

(52) U.S. Cl.
CPC .............. H04L 41/12 (2013.01); H04L 45/02 (2013.01)

(58) Field of Classification Search
None
See application file for complete search history.

(56) References Cited

U.S. PATENT DOCUMENTS 6,046,988 A 4/2000 Schenkel et al.
9,420,513 B1 * 8/2016 Yalagandula ......... H04W 24/00
(Continued)

FOREIGN PATENT DOCUMENTS

CN 1921419 A 2/2007
CN 101626315 A 1/2010
(Continued)

OTHER PUBLICATIONS

"Port Down Reconciliation (Dev)," Floodlight Controller—Project Floodlight, pp. 1-2, XP055502028, (Last modified Oct. 28, 2013).

Primary Examiner — Kodzovi Acolatse
(74) Attorney, Agent, or Firm — Leydig, Voit & Mayer, Ltd.

(57) ABSTRACT

In the method and device for discovering a network topology provided in embodiments of the present application, there is no need to collect multiple types of network characteristic data, which reduces consumption of network resources and can improve accuracy of discovering a network topology. The particular solution is: collecting state information of all ports of a network element of a to-be-analyzed network and deleting a port in a normally-closed state to obtain a required port set; acquiring a link set of each port in the port set and a similarity value of state information of two ports included in all links in the link set; setting a link with a maximum similarity value in the link set of each port as a candidate link of each port; and acquiring a network topology of the to-be-analyzed network according to the candidate link of each port.

10 Claims, 4 Drawing Sheets

(56) References Cited

U.S. PATENT DOCUMENTS

| | | | | |
|---|---|---|---|---|
| 2003/0121779 A1* | 7/2003 | Kidwell | ............. | G01N 27/3335 |
| | | | | 204/403.01 |
| 2009/0285128 A1* | 11/2009 | Swan | ...................... | H04L 41/12 |
| | | | | 370/256 |
| 2014/0115298 A1 | 4/2014 | Philip et al. | | |
| 2015/0180755 A1* | 6/2015 | Zhang | ................. | H04L 43/0858 |
| | | | | 370/244 |
| 2016/0277279 A1 | 9/2016 | Lin | | |

FOREIGN PATENT DOCUMENTS

| | | | |
|---|---|---|---|
| CN | 101640612 B | | 12/2011 |
| CN | 101917310 B | | 5/2012 |
| CN | 102523166 A | | 6/2012 |
| CN | 103716187 | * | 4/2014 |
| CN | 103716187 A | | 4/2014 |
| CN | 103828310 A | | 5/2014 |
| CN | 104125153 A | | 10/2014 |

* cited by examiner

Real network topology

METHOD AND DEVICE FOR DISCOVERING NETWORK TOPOLOGY

CROSS-REFERENCE TO RELATED APPLICATIONS

This application is a continuation of International Application No. PCT/CN2015/086151, filed on Aug. 5, 2015, which claims priority to Chinese Patent Application No. 201410395691.X, filed on Aug. 12, 2014. The disclosures of the aforementioned applications are hereby incorporated by reference in their entireties.

TECHNICAL FIELD

The present application relates to the field of network connection detection, and in particular, to a method and device for discovering a network topology.

BACKGROUND

In a network evaluation and optimization phase, an operator needs to evaluate and optimize the network and analyze a network element in the network and a service state, for example, collecting configuration information of the network element, collecting traffic information of a port, evaluating capacity of the port, discovering a traffic-overloaded port, and extending capacity or adjusting a traffic path of the traffic-overloaded port. When the network is evaluated and optimized by using an optimization and analysis tool, a network topology needs to be restored by depending on the optimization and analysis tool, so that a network traffic evaluation, a service evaluation and a simulation can be implemented based on the network topology, and a result of evaluating and analyzing the network can be displayed based on the network topology.

In a method for discovering a network topology in the prior art, network characteristic data of a network element in a to-be-analyzed network is collected, and a link set corresponding to a network topology discovery algorithm is obtained by calculation according to the collected network characteristic data and the corresponding network topology discovery algorithm to obtain the network topology. For example, the network characteristic data includes a port Internet Protocol (Internet Protocol, IP) address, a port alias and the like, and a network topology based on a characteristic of the port IP address can be obtained by calculation according to the port IP address and a port IP address topology discovery algorithm, or a network topology based on a characteristic of the port alias can be obtained by calculation according to the port alias and a port alias topology matching algorithm; or a network topology based on Cisco device networking (a protocol supports a Cisco device only) can be obtained by calculation according to the Cisco Discovery Protocol (Cisco Discovery Protocol, CDP), or the like.

In the prior art, if a network topology is discovered based on a single type of network characteristic data for a to-be-analyzed network, the network topology may be discovered at a low accuracy because devices from different manufactures in the to-be-analyzed network may not support a discovery of the network topology using the network characteristic data; in addition, when the network topology is discovered based on multiple types of network characteristic data, a large quantity of the multiple types of network characteristic data needs to be collected, consuming more network resources.

SUMMARY

According to a method and device for discovering a network topology provided in embodiments of the present application, it is not necessary to collect multiple types of network characteristic data, consuming less network resources, and reducing a case in which the network topology cannot be discovered accurately because a to-be-analyzed network cannot provide a particular specific type of network characteristic data.

According to a first aspect, an embodiment of the present application provides a method for discovering a network topology, and the method includes:

collecting state information of all ports of a network element in a to-be-analyzed network, and if there is a port of all the ports whose state is normally-closed, deleting the port in the normally-closed state from a first port set including all the ports to obtain a second port set, where if there is no port of all the ports whose state is normally-closed, the first port set is equal to the second port set;

obtaining a link set of each port in the second port set by using the following method: selecting one port in the second port set as a port of a link, selecting all ports except the selected port as the other port of the link to obtain all links corresponding to the selected port, and setting a set including all the links as a link set of the selected port, where the link is a link including two ports;

acquiring a similarity value between state information of two ports included in all the links in the link set of each port in the second port set according to a similarity algorithm and state information of each port in the second port set;

acquiring a link with a maximum similarity value in the link set of each port in the second port set as a candidate link of each port in the second port set; and acquiring a network topology of the to-be-analyzed network according to the candidate link of each port in the second port set.

With reference to the first aspect, in a first possible implementation, the state information of a port includes:

a data transmit rate of the port in each statistic period, and a data receive rate of the port in each statistic period; and the similarity value between the state information of the two ports included in all the links in the link set of each port in the second port set includes a similarity value between a data transmit rate of one of the two ports and a data receive rate of the other one of the two ports.

With reference to the first aspect or the first possible implementation of the first aspect, in a second possible implementation, the acquiring a network topology of the to-be-analyzed network according to the candidate link of each port in the second port set includes:

obtaining a link set of the to-be-analyzed network by performing an operation on a candidate link set including the candidate link of each port in the second port set, and the operation includes: combining the same links, and for at least two links of which only one port is the same, retaining a link with a maximum similarity value in the at least two links and deleting the rest of links, where the same links are at least two links including two ports, both of which are the same; and acquiring the network topology of the to-be-analyzed network according to each link in the link set of the to-be-analyzed network.

With reference to the first possible implementation of the first aspect, in a third possible implementation, the similarity algorithm is an average deviation algorithm, correspondingly, the acquiring a similarity value between state information of two ports included in all the links in the link set of each port in the second port set according to a similarity algorithm and state information of each port in the second port set includes:

acquiring an average deviation between the data transmit rate of one of the two ports included in all the links in the link set of each port, and the data receive rate of the other one of the two ports according to the average deviation algorithm; and acquiring the similarity value according to the following conversion formula between the average deviation and the similarity value; where the conversion formula includes:

$$r = \begin{cases} K/a & a > 0, \ K > 0 \text{ and } r < A \\ A & a = 0, \ A > 0 \end{cases}$$

where r represents the similarity value, a represents the average deviation, and both A and K are preset values.

With reference to the first possible implementation of the first aspect, in a fourth possible implementation, the similarity algorithm is a Pearson correlation coefficient algorithm, a least square algorithm, or a Dynamic Time Warping DTW algorithm, correspondingly, the acquiring a similarity value between state information of two ports included in all the links in the link set of each port in the second port set according to a similarity algorithm and state information of each port in the second port set includes:

acquiring the similarity value between the data transmit rate of one of the two ports included in all the links in the link set of each port, and the data receive rate of the other one of the two ports according to the state information of each port and the Pearson correlation coefficient algorithm, the least square algorithm, or the Dynamic Time Warping DTW algorithm.

With reference to the second possible implementation of the first aspect, in a fifth possible implementation, where the combining the same links includes:

combining the same links in the candidate link set, and setting a minimum one of all similarity values of the same links as a similarity value of the link retained after the combination.

With reference to the second possible implementation of the first aspect, in a sixth possible implementation, where the operation further includes: after retaining the link with a maximum similarity value in the at least two links and deleting the rest of links, selecting a link whose similarity value is greater than a preset threshold.

In a second aspect, an embodiment of the present application provides a device for discovering a network topology, the device including:

a collecting unit, configured to collect state information of all ports of a network element in a to-be-analyzed network, and if there is a port of all the ports whose state is normally-closed, delete the port in the normally-closed state from a first port set including all the ports to obtain a second port set, where if there is no port of all the ports whose state is normally-closed, the first port set is equal to the second port set;

a first acquiring unit, configured to obtain a link set of each port in the second port set by using the following method: selecting one port in the second port set as a port of a link, selecting all ports except the selected port as the other port of the link to obtain all links corresponding to the selected port, and setting a set including all the links as a link set of the selected port, where the link is a link including two ports;

a second acquiring unit, configured to acquire a similarity value between state information of two ports included in all the links in the link set of each port in the second port set according to a similarity algorithm and state information of each port in the second port set;

a third acquiring unit, configured to acquire a link with a maximum similarity value in the link set of each port in the second port set as a candidate link of each port in the second port set; and a topology acquiring unit, configured to acquire a network topology of the to-be-analyzed network according to the candidate link of each port in the second port set.

With reference to the second aspect, in a first possible implementation, the state information of a port includes:

a data transmit rate of the port in each statistic period, and a data receive rate of the port in each statistic period; and the similarity value between the state information of the two ports included in all the links in the link set of each port in the second port set includes a similarity value between a data transmit rate of one of the two ports and a data receive rate of the other one of the two ports.

With reference to the second aspect or the first possible implementation of the second aspect, in a second possible implementation, the topology acquiring unit is specifically configured to:

obtain a link set of the to-be-analyzed network by performing an operation on a candidate link set including the candidate link of each port in the second port set, and the operation includes: combining the same links, and for at least two links of which only one port is the same, retaining a link with a maximum similarity value in the at least two links, and deleting the rest of links, where the same links are at least two links including two ports, both of which are the same; and acquire the network topology of the to-be-analyzed network according to each link in the link set of the to-be-analyzed network.

With reference to the first possible implementation of the second aspect, in a third possible implementation, the similarity algorithm is an average deviation algorithm, the second acquiring unit is specifically configured to:

acquire an average deviation between the data transmit rate of one of the two ports included in all the links in the link set of each port, and the data receive rate of the other one of the two ports according to the average deviation algorithm; and acquire the similarity value according to the following conversion formula between the average deviation and the similarity value; where the conversion formula includes:

$$r = \begin{cases} K/a & a > 0, \ K > 0 \text{ and } r < A \\ A & a = 0, \ A > 0 \end{cases}$$

where r represents the similarity value, a represents the average deviation, and both A and K are preset values.

With reference to the first possible implementation of the second aspect, in a fourth possible implementation, the similarity algorithm is a Pearson correlation coefficient algorithm, a least square algorithm, or a Dynamic Time Warping DTW algorithm, the second acquiring unit is specifically configured to:

acquire the similarity value between the data transmit rate of one of two ports included in all the links in the link set of each port, and the data receive rate of the other one of the two ports according to the state information of each port and the Pearson correlation coefficient algorithm, the least square algorithm, or the Dynamic Time Warping DTW algorithm.

With reference to the second aspect or the first possible implementation of the second aspect, in a fifth possible implementation, the topology acquiring unit is specifically configured to:

obtain a link set of the to-be-analyzed network by performing an operation on a candidate link set including the candidate link of each port in the second port set, and the operation includes: combining the same links in the candidate link set, setting a minimum one of all similarity values of multiple same links as a similarity value of the link retained after the combination, and for at least two links of which only one port is the same, retaining a link with a maximum similarity value in the at least two links, and deleting the rest of links, where the same links are at least two links including the two ports, both of which are the same; and acquire the network topology of the to-be-analyzed network according to each link in the link set of the to-be-analyzed network.

With reference to the second aspect or the first possible implementation of the second aspect, in a sixth possible implementation, the topology acquiring unit is specifically configured to:

obtain a link set of the to-be-analyzed network by performing an operation on a candidate link set including the candidate link of each port in the second port set, and the operation includes: combining the same links, and for at least two links of which only one port is the same, retaining a link with a maximum similarity value in the at least two links and deleting the rest of links; and selecting a link whose similarity value is greater than a preset threshold, where the same links are at least two links including the two ports, both of which are the same; and acquire the network topology of the to-be-analyzed network according to each link in the link set of the to-be-analyzed network.

In the method and device for discovering a network topology provided in embodiments of the present application, firstly state information of all ports of a network element in a to-be-analyzed network is collected, and if there is a port of all the ports whose state is normally-closed, the port in the normally-closed state is deleted from a first port set including all the ports to obtain a second port set, where if there is no port of all the ports whose state is normally-closed, the first port set is equal to the second port set; a link set of each port in the second port set is obtained by using the following method: selecting one port in the second port set as a port of a link, selecting all ports except the selected port as the other port of the link to obtain all links corresponding to the selected port, and setting a set including all the links as a link set of the selected port, where the link is a link including two ports; a similarity value between state information of two ports included in all the links in the link set of each port in the second port set is acquired according to a similarity algorithm and state information of each port in the second port set; a link with a maximum similarity value in the link set of each port in the second port set is acquired as a candidate link of each port in the second port set; and finally a network topology of the to-be-analyzed network is acquired according to the candidate link of each port in the second port set. In this case, a network topology can be discovered based on state information of a port of a network element supported by all manufactures without collecting multiple types of network characteristic data, consuming less network resources, and also improving accuracy of discovering the network topology.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts should fall within the protection scope of the present application.

Figure 1:
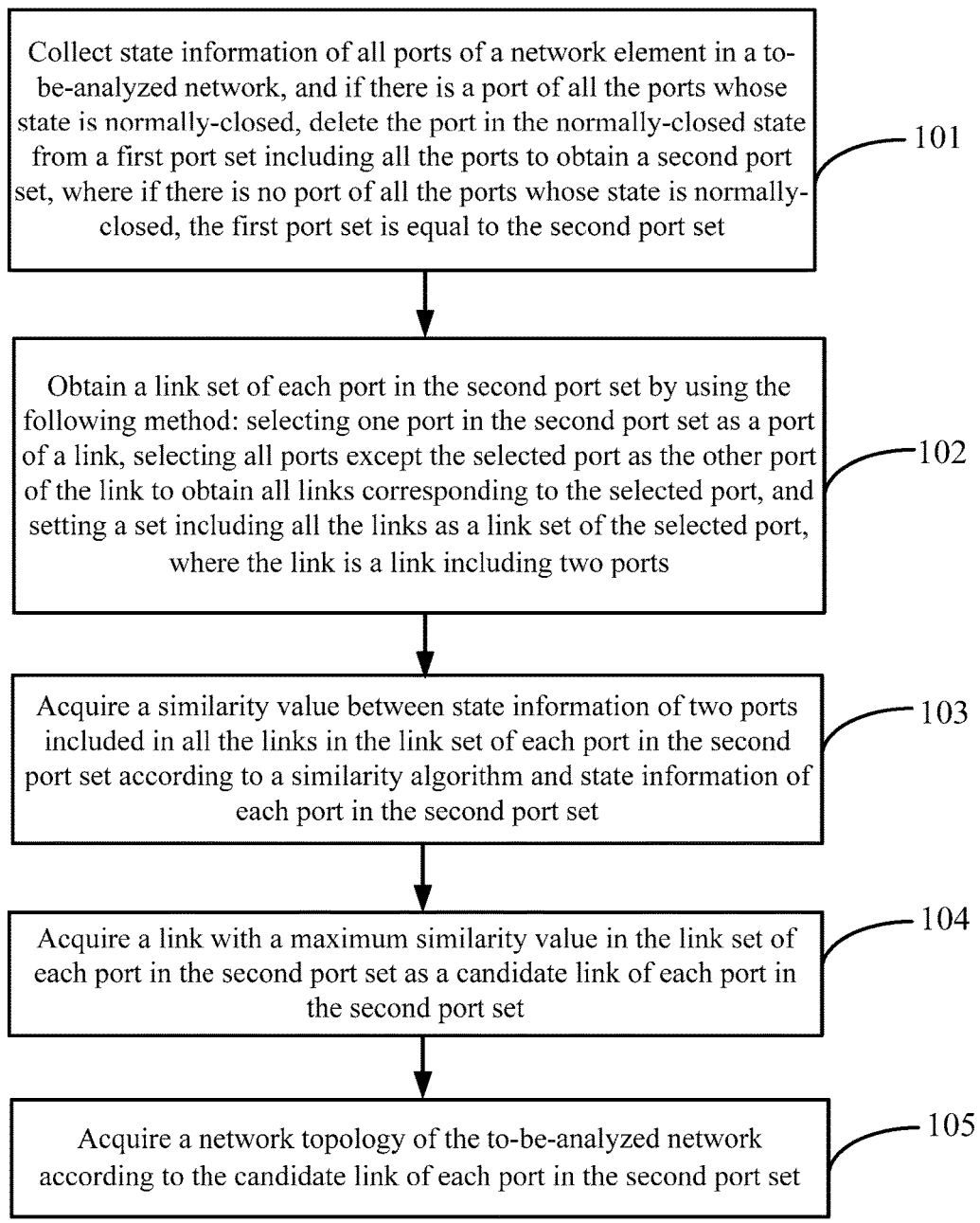
FIG. 1 is a first schematic flow chart of a method for discovering a network topology according to an embodiment of the present application.

A method for discovering a network topology according to an embodiment of the present application is shown in FIG. 1, where the method includes:

Step 101: Collect state information of all ports of a network element in a to-be-analyzed network, and if there is a port of all the ports whose state is normally-closed, delete the port in the normally-closed state from a first port set including all the ports to obtain a second port set, where if there is no port of all the ports whose state is normally-closed, the first port set is equal to the second port set.

Specifically, the state information of a port includes a data transmit rate of the port in each statistic period, and a data receive rate of the port in each statistic period.

Step 102: Obtain a link set of each port in the second port set by using the following method: selecting one port in the second port set as a port of a link, selecting all ports except the selected port as the other port of the link to obtain all links corresponding to the selected port, and setting a set including all the links as a link set of the selected port, where the link is a link including two ports.

Step 103: Acquire a similarity value between state information of two ports included in all the links in the link set of each port in the second port set according to a similarity algorithm and state information of each port in the second port set.

Step 104: Acquire a link with a maximum similarity value in the link set of each port in the second port set as a candidate link of each port in the second port set.

Step 105: Acquire a network topology of the to-be-analyzed network according to the candidate link of each port in the second port set.

In the method for discovering a network topology provided in embodiments of the present application, firstly state information of all ports of a network element in a to-be-analyzed network is collected, and if there is a port of all the ports whose state is normally-closed, the port in the normally-closed state is deleted from a first port set including all the ports to obtain a second port set, where if there is no port of all the ports whose state is normally-closed, the first port set is equal to the second port set; a link set of each port in the second port set is obtained by using the following method: selecting one port in the second port set as a port of a link, selecting all ports except the selected port as the other port of the link to obtain all links corresponding to the selected port, and setting a set including all the links as a link set of the selected port, where the link is a link including two ports; a similarity value between state information of two ports included in all the links in the link set of each port in the second port set is acquired according to a similarity algorithm and state information of each port in the second port set; a link with a maximum similarity value in the link set of each port in the second port set is acquired as a candidate link of each port in the second port set; and finally a network topology of the to-be-analyzed network is acquired according to the candidate link of each port in the second port set. In this case, a network topology can be discovered based on state information of a port of a network element supported by all manufactures without collecting multiple types of network characteristic data, consuming less network resources, and also improving accuracy of discovering the network topology.

In order to enable those skilled in the art to understand more clearly the technical solution, the method for discovering a network topology provided in the embodiment of the present application will be described below in detail with reference to specific embodiments:

Some basic content in the technical solution will be introduced below in brief prior to an introduction of the technical solution provided in this embodiment:

In the technical solution provided in this embodiment, a network element refers to a network element or a node in a network system, the element is a device capable of performing one or more functions independently. For example, in a GSM network system, a base station is a network element, and an entity capable of performing a function independently can function as a network element, and a switch, a router and the like are also network elements; a link can be a physical link or a logic link; and that a port is closed refers to the port DOWN, where the port DOWN is specifically physical DOWN of a port or a protocol DOWN of a port.

A set including all network elements of a to-be-analyzed network is defined as $N=\{N_1, N_2, \ldots, N_n\}$; and a set including all physical ports of all network elements is defined as P, where the $j^{th}$ physical port of the $i^{th}$ network element $N_i$ is denoted as Pij with i ranging from 1 to n and j ranging from 1 to m, and m represents the number of physical ports corresponding to the network element $N_i$, where a value of m can be different for a different network element.

Figure 2:
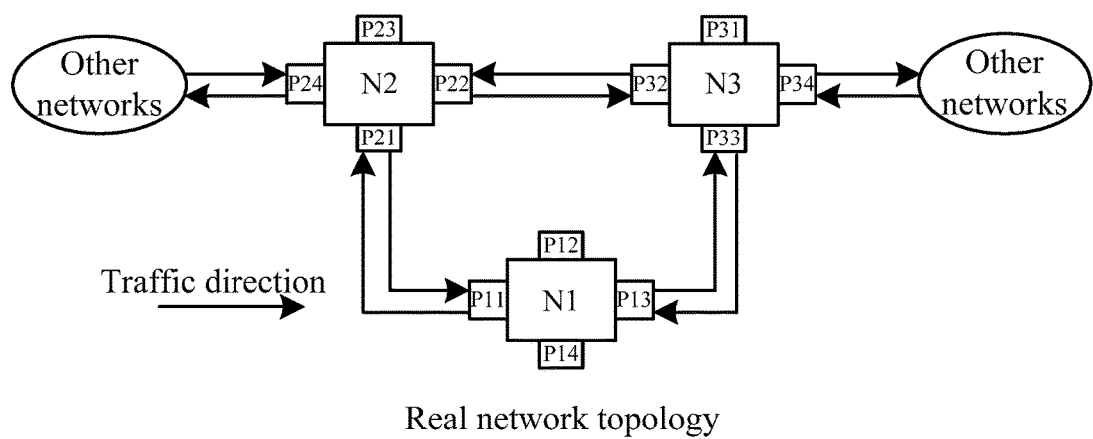
FIG. 2 is a real network topology of a to-be-analyzed network according to an embodiment of the present application.

For the sake of a convenient description of the technical solution provided in the embodiment of the present application, it is assumed in the following embodiment that the number of network elements in the to-be-analyzed network is 3 (that is, n=3), the set including all the network elements is $N=\{N_1, N_2, N_3\}$, the number of ports of each network element is 4 (that is, m=4), and the set including all the physical ports of all the network elements is $P=\{P_{11}, P_{12}, P_{13}, P_{14}, P_{21}, P_{22}, P_{23}, P_{24}, P_{31}, P_{32}, P_{33}, P_{34}\}$. The real network topology of the to-be-analyzed network is assumed as shown in FIG. 2.

Figure 3:
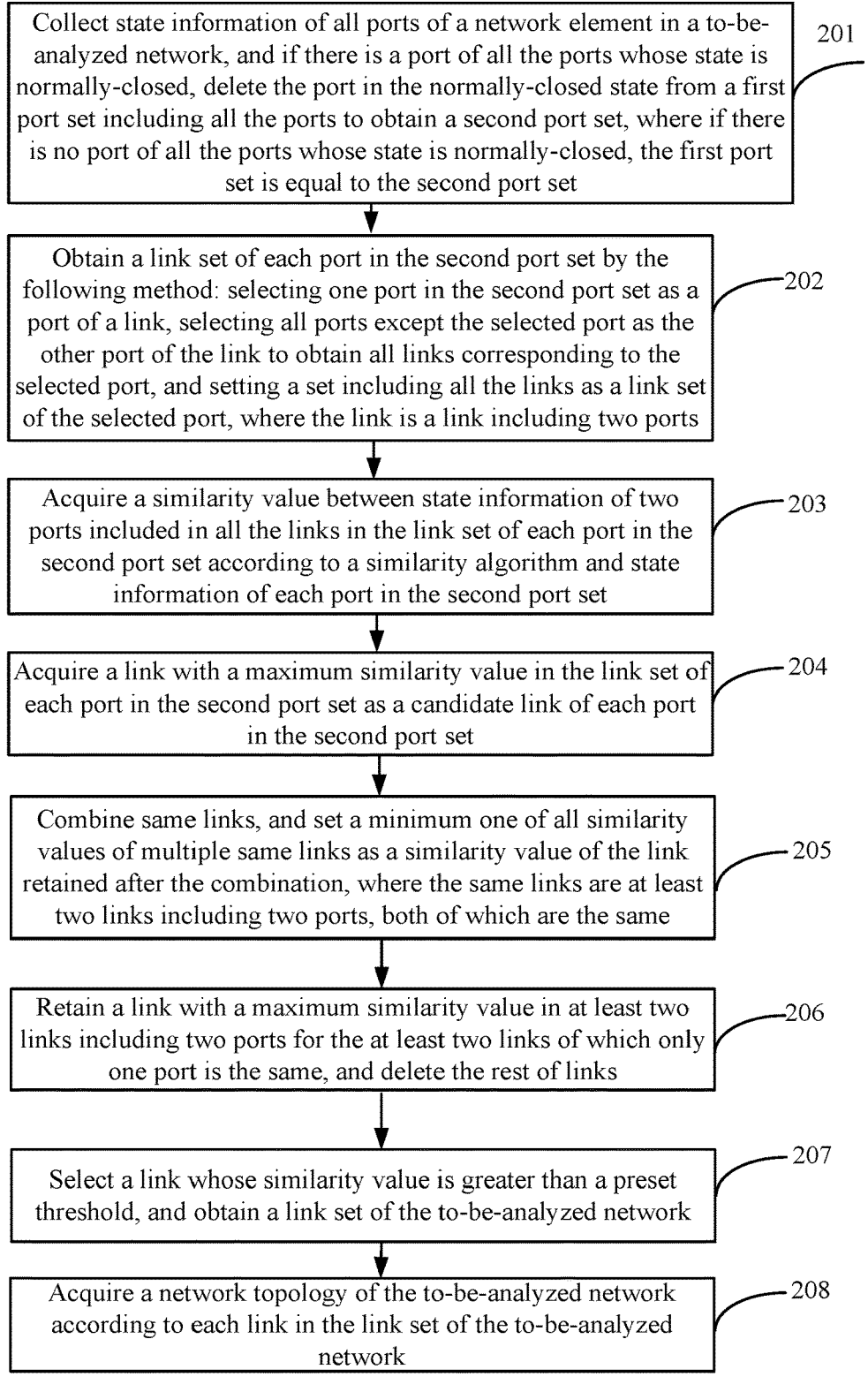
FIG. 3 is a second schematic flow chart of a method for discovering a network topology according to an embodiment of the present application.

A method for discovering a network topology based on the foregoing content and provided in an embodiment of the present application is shown as FIG. 3, where the method includes:

Step 201: Collect state information of all ports of a network element in a to-be-analyzed network, and if there is a port of all the ports whose state is normally-closed, delete the port in the normally-closed state from a first port set including all the ports to obtain a second port set, where if there is no port of all the ports whose state is normally-closed, the first port set is equal to the second port set.

Specifically, the state information of a port includes a data transmit rate of the port in each statistic period, and a data receive rate of the port in each statistic period.

Exemplarily, a data transmit rate and a data receive rate of 12 ports of 3 network elements in a to-be-analyzed network in all statistic period are collected, the collection is performed in every 15 minutes once and in 96 periods, which is shown in Table 1:

TABLE 1

| Network element | Port | Traffic direction | Average data rate (MB/s) | | | | |
|---|---|---|---|---|---|---|---|
| | | | 00:00:00 | 00:15:00 | 00:30:00 | ... | 23:45:00 |
| $N_1$ | $P_{11}$ | Transmit | 775 | 777 | 777 | ... | 785 |
| | | Receive | 793 | 793 | 793 | ... | 793 |
| | $P_{12}$ | Transmit | 0 | 0 | 0 | ... | 0 |
| | | Receive | 0 | 0 | 0 | ... | 0 |
| | $P_{13}$ | Transmit | 39 | 39 | 39 | ... | 39 |
| | | Receive | 40 | 40 | 40 | ... | 40 |
| | $P_{14}$ | Transmit | 0 | 0 | 0 | ... | 0 |
| | | Receive | 0 | 0 | 0 | ... | 0 |
| $N_2$ | $P_{21}$ | Transmit | 796 | 796 | 795 | ... | 795 |
| | | Receive | 778 | 779 | 779 | ... | 787 |
| | $P_{22}$ | Transmit | 1114 | 1115 | 1116 | ... | 1115 |
| | | Receive | 1101 | 1105 | 1110 | ... | 1108 |

TABLE 1-continued

| Network element | Port | Traffic direction | Average data rate (MB/s) | | | | |
|---|---|---|---|---|---|---|---|
| | | | 00:00:00 | 00:15:00 | 00:30:00 | ... | 23:45:00 |
| | $P_{23}$ | Transmit | 0 | 0 | 0 | ... | 0 |
| | | Receive | 0 | 0 | 0 | ... | 0 |
| | $P_{24}$ | Transmit | 485 | 485 | 484 | ... | 484 |
| | | Receive | 484 | 485 | 487 | ... | 485 |
| $N_3$ | $P_{31}$ | Transmit | 0 | 0 | 0 | ... | 0 |
| | | Receive | 0 | 0 | 0 | ... | 0 |
| | $P_{32}$ | Transmit | 1101 | 1105 | 1110 | ... | 1105 |
| | | Receive | 1114 | 1115 | 1117 | ... | 1116 |
| | $P_{33}$ | Transmit | 40 | 40 | 40 | ... | 40 |
| | | Receive | 40 | 40 | 40 | ... | 39 |
| | $P_{34}$ | Transmit | 296 | 296 | 296 | ... | 296 |
| | | Receive | 305 | 307 | 307 | ... | 310 |

The collected data of the ports with both the data transmit rate and the data receive rate thereof in all statistic period being zero, that is, with states thereof being DOWN, in Table 1 are deleted, the ports $P_{12}$, $P_{14}$, $P_{23}$, and $P_{31}$ are deleted from a first port set including all the ports to obtain a second port set $\{P_{11}, P_{13}, P_{21}, P_{22}, P_{24}, P_{32}, P_{33}, P_{34}\}$ shown in Table 2:

TABLE 2

| Network element | Port | Traffic direction | Average data rate (MB/s) | | | | |
|---|---|---|---|---|---|---|---|
| | | | 00:00:00 | 00:15:00 | 00:30:00 | ... | 23:45:00 |
| $N_1$ | $P_{11}$ | Transmit | 775 | 777 | 777 | ... | 785 |
| | | Receive | 793 | 793 | 793 | ... | 793 |
| | $P_{13}$ | Transmit | 39 | 39 | 39 | ... | 39 |
| | | Receive | 40 | 40 | 40 | ... | 40 |
| $N_2$ | $P_{21}$ | Transmit | 796 | 796 | 795 | ... | 795 |
| | | Receive | 778 | 779 | 779 | ... | 787 |
| | $P_{22}$ | Transmit | 1114 | 1115 | 1116 | ... | 1115 |
| | | Receive | 1101 | 1105 | 1110 | ... | 1108 |
| | $P_{24}$ | Transmit | 485 | 485 | 484 | ... | 484 |
| | | Receive | 484 | 485 | 487 | ... | 485 |
| $N_3$ | $P_{32}$ | Transmit | 1101 | 1105 | 1110 | ... | 1105 |
| | | Receive | 1114 | 1115 | 1117 | ... | 1116 |
| | $P_{33}$ | Transmit | 40 | 40 | 40 | ... | 40 |
| | | Receive | 40 | 40 | 40 | ... | 39 |
| | $P_{34}$ | Transmit | 296 | 296 | 296 | ... | 296 |
| | | Receive | 305 | 307 | 307 | ... | 310 |

Step 202: Obtain a link set of each port in the second port set by using the following method: selecting one port in the second port set as a port of a link, selecting all ports except the selected port as the other port of the link to obtain all links corresponding to the selected port, and setting a set including all the links as a link set of the selected port, where the link is a link including two ports.

Exemplarily, taking $P_{11}$ in the second as an example, a link set of P11 is $\{(P_{11}, P_{13}), (P_{11}, P_{21}), (P_{11}, P_{22}), (P_{11}, P_{24}), (P_{11}, P_{32}), (P_{11}, P_{33})\}$, where $(P_{11}, P_{13})$ represents a link including $P_{11}$ and $P_{13}$, and each link in the link set of $P_{11}$ includes the port $P_{11}$.

Step 203: Acquire a similarity value between state information of two ports included in all the links in the link set of each port in the second port set according to a similarity algorithm and state information of each port in the second port set.

Specifically, the similarity algorithm is an average deviation algorithm, and an average deviation between a data transmit rate of one of two ports included in all the links in the link set of each port and a data receive rate of the other one of the two ports is acquired; and a similarity value between state information of the two ports included in all the links is acquired according to the following conversion formula between the average deviation and the similarity value; where the conversion formula includes:

$$r = \begin{cases} K/a & a > 0, \ K > 0 \text{ and } r < A \\ A & a = 0, \ A > 0 \end{cases}$$

where r represents the similarity value, a represents the average deviation, and both A and K are preset values.

Exemplarily, as shown in Table 3:

TABLE 3

| | | Receive rate of receive port | | | | | | | |
|---|---|---|---|---|---|---|---|---|---|
| | Average deviation | $P_{11}$ | $P_{13}$ | $P_{21}$ | $P_{22}$ | $P_{24}$ | $P_{32}$ | $P_{33}$ | $P_{34}$ |
| Transmit rate of transmit port | $P_{11}$ | NA | 734.0888 | 2.4666 | 306.1222 | 292.5111 | 309.2778 | 734.9667 | 465.5222 |
| | $P_{13}$ | 750.2333 | NA | 738.0444 | 1040.7 | 443.0666 | 1044.856 | 0.6111 | 270.0556 |
| | $P_{21}$ | 2.4777 | 751.2222 | NA | 288.9889 | 309.6444 | 292.1444 | 752.1 | 482.6556 |
| | $P_{22}$ | 294.4777 | 1043.222 | 306.6666 | NA | 601.6444 | 0.2111 | 1044.1 | 774.6556 |
| | $P_{24}$ | 309.1 | 439.6444 | 296.9111 | 600.5667 | NA | 603.7222 | 440.5222 | 171.0778 |
| | $P_{32}$ | 291.6777 | 1040.422 | 303.8666 | 0.2111 | 598.8444 | NA | 1041.3 | 771.8556 |
| | $P_{33}$ | 748.7444 | 0 | 736.5555 | 1040.211 | 441.5777 | 1043.367 | NA | 268.5667 |
| | $P_{34}$ | 493.4555 | 255.2888 | 481.2666 | 784.9222 | 186.2888 | 788.0778 | 256.1667 | NA |

Here taking the link ($P_{11}$, $P_{12}$) in the link set of $P_{11}$ in Table 3 as an example, the average deviation between $P_{11}$ and $P_{21}$ will be calculated as described below, where $P_{11}$ is a transmit port, and $P_{21}$ is a receive port.

For ease of description, referring to Table 2, and taking the data in the first three periods as an example:

Firstly the average deviation between the data transmit rate of $P_{11}$ and the data receive rate of $P_{21}$ is obtained by calculation by using the average deviation calculating formula of $$\bar{d} = \frac{1}{n}|di|$$

as follows:

$|d1|=|775-778|=3$ $|d2|=|777-779|=3$ $|d3|=|777-779|=2$ $\bar{d}=(|d1|+|d2|+|d3|)/3=8/3=2.6666$ It should be noted that the average deviation described here is calculated for only three periods, but the average deviation is calculated in Table 3 for 96 periods, so that the average deviation between the data transmit rate of $P_{11}$ and the data receive rate of $P_{21}$ is 2.4666.

It should be further noted that the similarity algorithm in the embodiment of the present application includes not only the foregoing average deviation algorithm, but also a Pearson correlation coefficient algorithm, a least square algorithm, a Dynamic Time Warping (Dynamic Time Warping, DTW) algorithm, or another algorithm, and when a similarity value between state information of two ports included in all links in the link set of each port is calculated, those ordinarily skilled in the art can calculate the similarity value between the state information of the two ports included in all links according to a parameter provided in this embodiment using the foregoing algorithm, and a detailed process of calculation will be not repeated here, and the embodiment of the present application will not impose any limitation on an algorithm during calculation, but those skilled in the art can calculate them in any appropriate algorithm as needed in reality.

Step 204: Acquire a link with a maximum similarity value in the link set of each port in the second port set as a candidate link of each port in the second port set.

Specifically, for a link of any port of each port in the second port set, a link of which a minimum average deviation between characteristic information of included two ports is selected.

Respectively relative average deviation of the two ports are obtained by calculation according to the minimum average deviation and state characteristic information of the two ports of a link with a minimum average deviation; and If both the respectively relative average deviations of the two ports are less than a preset threshold, the link with a minimum average deviation is set as a candidate link of any port, and the candidate link of each port is obtained sequentially.

Exemplarily, a link with a minimum average deviation in the link set of all ports can be obtained according to Table 3. As shown in Table 4:

TABLE 4

| Port | Candidate link of the port (transmit port, receive port) | minimum average deviation |
|---|---|---|
| $P_{11}$ | ($P_{11}$, $P_{21}$) | 2.4666 |
| $P_{13}$ | ($P_{13}$, $P_{33}$) | 0.6111 |
| $P_{21}$ | ($P_{21}$, $P_{11}$) | 2.4777 |
| $P_{22}$ | ($P_{22}$, $P_{32}$) | 0.2111 |
| $P_{24}$ | ($P_{24}$, $P_{34}$) | 171.0777 |
| $P_{32}$ | ($P_{32}$, $P_{22}$) | 0.2111 |
| $P_{33}$ | ($P_{33}$, $P_{13}$) | 0.0000 |
| $P_{34}$ | ($P_{34}$, $P_{24}$) | 186.2888 |

Here taking the link ($P_{11}$, $P_{21}$) of $P_{11}$ as an example, respectively relative average deviations of $P_{11}$ and $P_{21}$ may be obtained by calculation as described below, where $P_{11}$ is a transmit port, and P21 is a receive port; and a preset threshold can be set to 30%.

For ease of description, referring to Table 2, and taking the data in the first three periods as an example:

The respectively relative average deviations of $P_{11}$ and $P_{21}$ are calculated in a relative average deviation formula of $$\bar{d}_r = \frac{\bar{d}}{\bar{x}} * 100\%.$$

An average value of the data transmit rate of $P_{11}$ is $\bar{x}=775+777+777=776.3333$.

An average value of the data receive rate of $P_{21}$ is $\bar{x}=778+779+779=778.6666$.

The average deviations between the data transmit rate of $P_{11}$ and the data receive rate of $P_{21}$ is $\bar{d}=(|d1|+|d2|+|d3|)/3=8/3=2.6666$.

The relative average deviation of $P_{11}$ is $\overline{d}_r=2.6666\div776.3333\times100\%=0.343495\%$.

Similarly, the relative average deviation of $P_{21}$ is calculated as $\overline{d}_r=2.6666\div778.6666\times100\%=0.342466\%$.

Both the relative average deviations of $P_{11}$ and $P_{21}$ are less than 30%, so that the link $(P_{11}, P_{21})$ can be set as the candidate link of $P_{11}$.

Step 205, step 206 and step 207 are performed on a candidate link set including the candidate link of each port in the second port set, and it should be noted that an order of performing step 205, step 206 and step 207 can be adjusted, the embodiment of the present application impose no limitation on the order, and those skilled in the art can select any appropriate order as needed in reality.

Step 205: Combine the same links, and set a minimum one of all similarity values of multiple same links as a similarity value of the link retained after the combination, where the same links are at least two links including two ports, both of which are the same.

Exemplarily, referring to Table 4, the same links of the candidate link of each port in the second port set are combined, for example, $(P_{11}, P_{21})$ and $(P_{21}, P_{11})$ are combined, and since the similarity value is inversely proportional to the average deviation, the maximum 2.477 of the average deviations corresponding to $(P_{11}, P_{21})$ and $(P_{21}, P_{11})$ is determined as an average deviation of $(P_{21}, P_{11})$ remaining after the same links are combined.

Step 206: Retain a link with a maximum similarity value in at least two links including two ports for the at least two links of which only one port is the same, and delete the rest of links.

Exemplarily, the link with a minimum average deviation in multiple links of which only one port is the same is retained; and similarity values of all links in the candidate link set are calculated according to the conversion formula between the average deviation and the similarity value in step 203 (it is assumed K is 100) as shown in Table 5:

TABLE 5

| Candidate link of port | Average deviation of link | Similarity value of link |
| --- | --- | --- |
| $(P_{13}, P_{33})$ | 0.6111 | 100 ÷ 0.6111 = 163.6393 |
| $(P_{21}, P_{11})$ | 2.4777 | 100 ÷ 2.4777 = 40.3600 |
| $(P_{22}, P_{32})$ | 0.2111 | 100 ÷ 0.2111 = 473.7091 |
| $(P_{34}, P_{24})$ | 186.2888 | 100 ÷ 186.2888 = 0.5368 |

Step 207: Select a link whose similarity value is greater than a preset threshold, and obtain a link set of the to-be-analyzed network.

Exemplarily, the similarity values of all links shown in Table 5 are compared with the preset threshold, and if the preset threshold is 10, a link whose similarity value is greater than 10 may be selected, and a link set $\{(P_{21}, P_{11}), (P_{22}, P_{32}), (P_{13}, P_{33})\}$ of the to-be-analyzed network is obtained.

Step 208: Acquire a network topology of the to-be-analyzed network according to each link in the link set of the to-be-analyzed network.

Exemplarily, a network topology of the to-be-analyzed network can be obtained according to each link in the link set $\{(P_{21}, P_{11}), (P_{22}, P_{32}), (P_{13}, P_{33})\}$ that is of the to-be-analyzed network and obtained in step 207: the port $P_{11}$ of a network element N1 is connected with the port $P_{21}$ of a network element N2, the port $P_{22}$ of the network element N2 is connected with the port $P_{32}$ of a network element N3, and the port $P_{33}$ of the network element N3 is connected with the port $P_{13}$ of the network element N1. It can be seen that, the network topology of the to-be-analyzed network obtained in the technical solution provided in the foregoing embodiment is the same as a real network topology of the to-be-analyzed network shown in FIG. 2.

It can be seen from the embodiment above, the method for discovering a network topology provided in the embodiment only need to collect independent state information of a port, for example, traffic characteristic information, where the independent state information of the port is unrelated to a manufacturer of a device, and the traffic characteristic data of the port is easy to obtain and can reflect accurately a relationship between one port and another, so the traffic characteristic data of the port can be analyzed at a high accuracy by using the technical solution provided in the embodiment of the present application, and compared with a limited scenario of single type of network characteristic data in the prior art, a large quantity of network resources may be consumed when collecting a large amount data for multiple types of network characteristic data, the technical solution provided in the embodiment of the present application is simple and effective, collects less data and consumes less network resources.

In addition, the foregoing embodiment is implemented based on the traffic characteristic information of the port, it should be noted that a network topology of a to-be-analyzed network can alternatively be determined based on state parameters of a port at different points of time, alarm information and/or log information of the port, where the alarm information and/or the log information of the port of the network element can be collected by extracting information identifying the port in a state of UP/DOWN and error code information of port data, from the alarm information of the port, where a state parameter of the port includes physical UP/DOWN or protocol UP/DOWN; and a similarity value between state changes of every two different ports at different points of time is obtained by calculation according to state change parameters of the two ports at the different points of time, the alarm information and/or the log information of the port and the similarity algorithm, and the two ports whose similarity value are greater the preset threshold are set as ports connected with each other, and finally the network topology of a to-be-analyzed network is obtained according to the ports connected with each other. The solution above can be implemented by those ordinarily skilled in the art according to the method provided in the particular embodiments above without any inventive effort.

In the method and device for discovering a network topology provided in embodiments of the present application, firstly state information of all ports of a network element in a to-be-analyzed network is collected, and if there is a port of all the ports whose state is normally-closed, the port in the normally-closed state is deleted from a first port set including all the ports to obtain a second port set, where if there is no port of all the ports whose state is normally-closed, the first port set is equal to the second port set; a link set of each port in the second port set is obtained by using the following method: selecting one port in the second port set as a port of a link, selecting all ports except the selected port as the other port of the link to obtain all links corresponding to the selected port, and setting a set including all the links as a link set of the selected port, where the link is a link including two ports; a similarity value between state information of two ports included in all the links in the link set of each port in the second port set is acquired according to a similarity algorithm and state information of each port in the second port set; a link with a maximum similarity value in the link set of each port in the second port set is acquired as a candidate link of each port in the second port set; and finally a network topology of the to-be-analyzed network is acquired according to the candidate link of each port in the second port set. In this case, a network topology can be discovered based on state information of a port of a network element supported by all manufactures without collecting multiple types of network characteristic data, consuming less network resources, and also improving accuracy of discovering the network topology.

Figure 4:
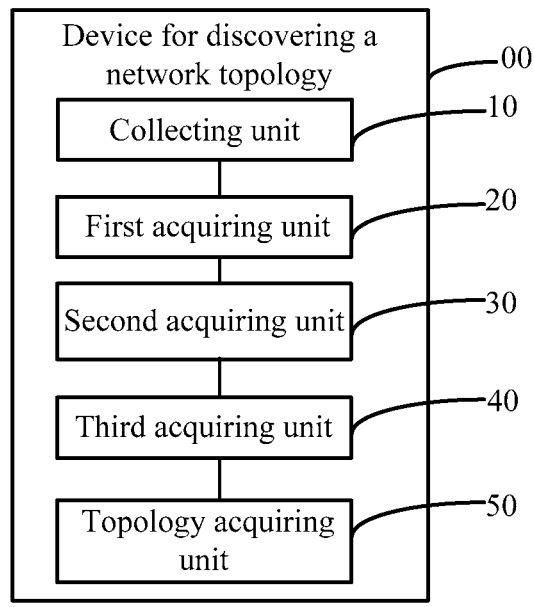
FIG. 4 is a first schematic structural diagram of a device for discovering a network topology according to an embodiment of the present application.

An embodiment of the present application provides a device 00 for discovering a network topology, and as shown in FIG. 4, the device 00 includes:

a collecting unit 10, configured to collect state information of all ports of a network element in a to-be-analyzed network, and if there is a port of all the ports whose state is normally-closed, delete the port in the normally-closed state from a first port set including all the ports to obtain a second port set, where if there is no port of all the ports whose state is normally-closed, the first port set is equal to the second port set.

a first acquiring unit 20, configured to obtain a link set of each port in the second port set by using the following method: selecting one port in the second port set as a port of a link, selecting all ports except the selected port as the other port of the link to obtain all links corresponding to the selected port, and setting a set including all the links as a link set of the selected port, where the link is a link including two ports.

a second acquiring unit 30, configured to acquire a similarity value between state information of two ports included in all the links in the link set of each port in the second port set according to a similarity algorithm and state information of each port in the second port set.

a third acquiring unit 40, configured to acquire a link with a maximum similarity value in the link set of each port in the second port set as a candidate link of each port in the second port set, and a topology acquiring unit 50, configured to acquire a network topology of the to-be-analyzed network according to the candidate link of each port in the second port set.

Optionally the state information of a port includes:

a data transmit rate of the port in each statistic period, and a data receive rate of the port in each statistic period; and correspondingly, the similarity value between the state information of the two ports included in all the links in the link set of each port in the second port set includes a similarity value between a data transmit rate of one of the two ports, and a data receive rate of the other one of the two ports.

Optionally the topology acquiring unit 50 is specifically configured to:

obtain a link set of the to-be-analyzed network by performing an operation on a candidate link set including the candidate link of each port in the second port set, and the operation includes: combining the same links, and for at least two links of which only one port is the same, retaining a link with a maximum similarity value in the at least two links, and deleting the rest of links, where the same links are at least two links including two ports, both of which are the same; and acquire the network topology of the to-be-analyzed network according to each link in the link set of the to-be-analyzed network.

Optionally the second acquiring unit 30 is specifically configured to: acquire an average deviation between the data transmit rate of one of the two ports included in all the links in the link set of each port, and the data receive rate of the other one of the two ports according to the average deviation algorithm; and acquire the similarity value according to the following conversion formula between the average deviation and the similarity value; where the conversion formula includes:

$$r = \begin{cases} K/a & a > 0, \; K > 0 \text{ and } r < A \\ A & a = 0, \; A > 0 \end{cases}$$

where r represents the similarity value, a represents the average deviation, and both A and K are preset values.

Optionally the second acquiring unit 30 is further specifically configured to:

acquire the similarity value between the data transmit rate of one of two ports included in all the links in the link set of each port, and the data receive rate of the other one of the two ports according to the state information of each port and a Pearson correlation coefficient algorithm, a least square algorithm, or a Dynamic Time Warping DTW algorithm, where the similarity algorithm is the Pearson correlation coefficient algorithm, the least square algorithm, or the Dynamic Time Warping DTW algorithm.

Optionally the topology acquiring unit 50 is further specifically configured to:

obtain a link set of the to-be-analyzed network by performing an operation on a candidate link set including the candidate link of each port in the second port set, and the operation includes: combining the same links in the candidate link set, setting a minimum one of all similarity values of multiple same links as a similarity value of the link retained after the combination, and for at least two links of which only one port is the same, retaining a link with a maximum similarity value in the at least two links, and deleting the rest of links, where the same links are at least two links including the two ports, both of which are the same; and acquire the network topology of the to-be-analyzed network according to each link in the link set of the to-be-analyzed network.

Optionally the topology acquiring unit 50 is further specifically configured to:

obtain a link set of the to-be-analyzed network by performing an operation on a candidate link set including the candidate link of each port in the second port set, and the operation includes: combining the same links, and for at least two links of which only one port is the same, retaining a link with a maximum similarity value in the at least two links and deleting the rest of links; and selecting a link whose similarity value is greater than a preset threshold, where the same links are at least two links including the two ports, both of which are the same; and acquire the network topology of the to-be-analyzed network according to each link in the link set of the to-be-analyzed network.

The device provided in this embodiment is configured to perform the method in the foregoing embodiments, and reference may be made to the descriptions in all the embodiments above of the method for working processes and working principles of all units in the device provided in this embodiment, a repeated description will not be described here.

In the device for discovering a network topology provided in embodiments of the present application, firstly state information of all ports of a network element in a to-be-analyzed network is collected, and if there is a port of all the ports whose state is normally-closed, the port in the normally-closed state is deleted from a first port set including all the ports to obtain a second port set, where there is no port of all the ports whose state is normally-closed, the first port set is equal to the second port set; a link set of each port in the second port set is obtained by using the following method: selecting one port in the second port set as a port of a link, selecting all ports except the selected port as the other port of the link to obtain all links corresponding to the selected port, and setting a set including all the links as a link set of the selected port, where the link is a link including two ports; a similarity value between state information of two ports included in all the links in the link set of each port in the second port set is acquired according to a similarity algorithm and state information of each port in the second port set; a link with a maximum similarity value in the link set of each port in the second port set is acquired as a candidate link of each port in the second port set; and finally a network topology of the to-be-analyzed network is acquired according to the candidate link of each port in the second port set. In this case, a network topology can be discovered based on state information of a port of a network element supported by all manufactures without collecting multiple types of network characteristic data, consuming less network resources, and also improving accuracy of discovering the network topology.

Figure 5:
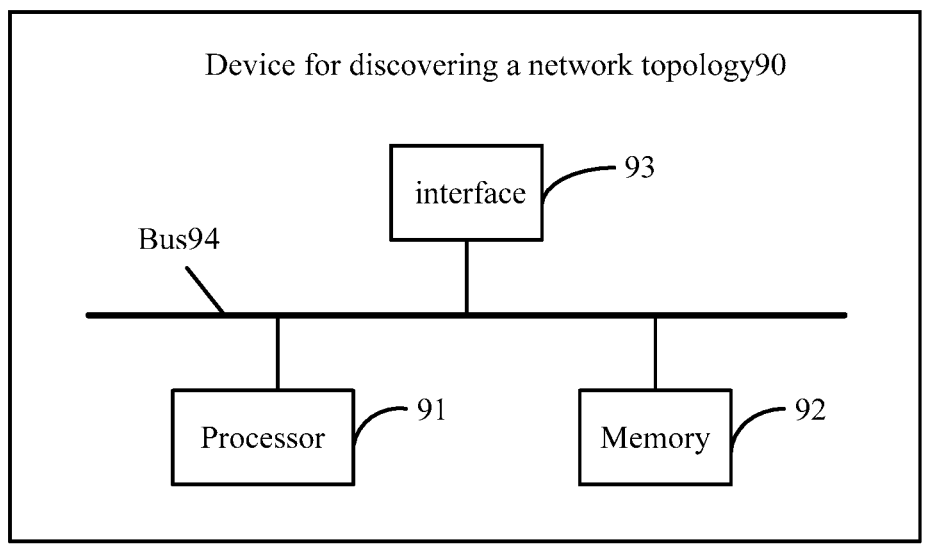
FIG. 5 is a second schematic structural diagram of a device for discovering a network topology according to an embodiment of the present application.

An embodiment of the present application further provides a device 90 for discovering a network topology, and as shown in FIG. 5, the device 90 includes: a bus 94; and a processor 91, a memory 92, and an interface 93 that are connected with the bus 94, where the interface 93 is configured for communication; the memory 92 is configured to store an instruction; and the processor 91 is configured to execute the instruction, and the processor 91 is configured to:

collect state information of all ports of a network element in a to-be-analyzed network, and if there is a port of all the ports whose state is normally-closed, delete the port in the normally-closed state from a first port set including all the ports to obtain a second port set, where if there is no port of all the ports whose state is normally-closed, the first port set is equal to the second port set;

obtain a link set of each port in the second port set by using the following method: selecting one port in the second port set as a port of a link, selecting all ports except the selected port as the other port of the link to obtain all links corresponding to the selected port, and setting a set including all the links as a link set of the selected port, where the link is a link including two ports;

acquire a similarity value between state information of two ports included in all the links in the link set of each port in the second port set according to a similarity algorithm and state information of each port in the second port set;

acquire a link with a maximum similarity value in the link set of each port in the second port set as a candidate link of each port in the second port set; and acquire a network topology of the to-be-analyzed network according to the candidate link of each port in the second port set.

Optionally the state information of a port includes: a data transmit rate of the port in each statistic period, and a data receive rate of the port in each statistic period; and correspondingly, the similarity value between the state information of the two ports included in all the links in the link set of each port in the second port set includes a similarity value between a data transmit rate of one of the two ports, and a data receive rate of the other one of the two ports.

Optionally the processor 91 is configured to execute the instruction to acquire a network topology of the to-be-analyzed network according to the candidate link of all the ports in the second port set, and the processor 91 is specifically configured to:

obtain a link set of the to-be-analyzed network by performing an operation on a candidate link set including the candidate link of each port in the second port set, and the operation includes: combining the same links, and for at least two links of which only one port is the same, retaining a link with a maximum similarity value in the at least two links, and deleting the rest of links, where the same links are at least two links including two ports, both of which are the same; and acquire the network topology of the to-be-analyzed network according to each link in the link set of the to-be-analyzed network.

Optionally the processor 91 is configured to execute the instruction to acquire a similarity value between state information of two ports included in all the links in the link set of each port in the second port set according to state information of each port in the second port set and a similarity algorithm, where the similarity algorithm is an average deviation algorithm, and the processor 91 is specifically configured to:

acquire an average deviation between the data transmit rate of one of the two ports included in all the links in the link set of each port, and the data receive rate of the other one of the two ports according to the average deviation algorithm; and acquire the similarity value according to the following conversion formula between the average deviation and the similarity value; where the conversion formula includes:

$$r = \begin{cases} K/a & a > 0, \ K > 0 \text{ and } r < A \\ A & a = 0, \ A > 0 \end{cases}$$

where r represents the similarity value, a represents the average deviation, and both A and K are preset values.

Optionally the processor 91 is configured to execute the instruction to acquire the similarity value between the state information of the two ports included in all the links in the link set of each port in the second port set according to the state information of each port in the second port set and the similarity algorithm, where the similarity algorithm is a Pearson correlation coefficient algorithm, a least square algorithm, or a Dynamic Time Warping DTW algorithm, and the processor 91 is specifically configured to:

acquire the similarity value between the data transmit rate of one of two ports included in all the links in the link set of each port, and the data receive rate of the other one of the two ports according to the state information of each port and the Pearson correlation coefficient algorithm, the least square algorithm, or the Dynamic Time Warping DTW algorithm.

Optionally the processor 91 is configured to execute the instruction to combine the same links and specifically configured to:

combine the same links in the candidate link set, and set a minimum one of all similarity values of multiple same links as a similarity value of the link retained after the combination.

Optionally the processor 91 is configured to execute the instruction to obtain a link set of the to-be-analyzed network by performing an operation on a candidate link set including the candidate link of each port in the second port set, and the operation further include: after retaining the link with a maximum similarity value in the at least two links and deleting the rest of links, selecting a link whose similarity value is greater than a preset threshold.

The device provided in this embodiment is configured to perform the method in the foregoing embodiments, and reference may be made to the descriptions in all the embodiments above of the method for working processes and working principles of all units in the device provided in this embodiment, a repeated description will not be described here.

In the device for discovering a network topology provided in embodiments of the present application, firstly state information of all ports of a network element in a to-be-analyzed network is collected, and if there is a port of all the ports whose state is normally-closed, the port in the normally-closed state is deleted from a first port set including all the ports to obtain a second port set, where if there is no port of all the ports whose state is normally-closed, the first port set is equal to the second port set; a link set of each port in the second port set is obtained by using the following method: selecting one port in the second port set as a port of a link, selecting all ports except the selected port as the other port of the link to obtain all links corresponding to the selected port, and setting a set including all the links as a link set of the selected port, where the link is a link including two ports; a similarity value between state information of two ports included in all the links in the link set of each port in the second port set is acquired according to a similarity algorithm and state information of each port in the second port set; a link with a maximum similarity value in the link set of each port in the second port set is acquired as a candidate link of each port in the second port set; and finally a network topology of the to-be-analyzed network is acquired according to the candidate link of each port in the second port set. In this case, a network topology can be discovered based on state information of a port of a network element supported by all manufactures without collecting multiple types of network characteristic data, consuming less network resources, and also improving accuracy of discovering the network topology.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A method for discovering a network topology, comprising:
    collecting state information of all ports of a network element in a to-be-analyzed network, and if there is a port of all the ports whose state is normally-closed, deleting the port in the normally-closed state from a first port set comprising all the ports to obtain a second port set, wherein if there is no port of all the ports whose state is normally-closed, the first port set is equal to the second port set;
    obtaining a link set of each port in the second port set by using the following method:
        selecting one port in the second port set as a port of a link comprising two ports,
        selecting all ports except the selected port as the other port of the link to obtain all links corresponding to the selected port, and
        setting a set comprising all the links as a link set of the selected port;
    acquiring a similarity value between state information of two ports comprised in all the links in the link set of each port in the second port set according to a similarity algorithm and state information of each port in the second port set;
    acquiring a link with a maximum similarity value in the link set of each port in the second port set as a candidate link of each port in the second port set; and
    acquiring a network topology of the to-be-analyzed network according to the candidate link of each port in the second port set, including
        obtaining a link set of the to-be-analyzed network by performing an operation on a candidate link set comprising the candidate link of each port in the second port set, wherein the operation comprises:
            combining same links in the candidate link set and setting a minimum one of all similarity values of the same links as a similarity value of one or more links retained after the combination, wherein the same links are at least two links comprising two ports, both of which are the same, and
            for at least two links of which only one port is the same, retaining a link with a maximum similarity value in the at least two links and deleting the rest of links; and
        acquiring the network topology of the to-be-analyzed network according to each link in the link set of the to-be-analyzed network.

2. The method according to claim 1, wherein the state information of a port comprises:
    a data transmit rate of the port in each statistic period and a data receive rate of the port in each statistic period; and
    the similarity value between the state information of the two ports comprised in all the links in the link set of each port in the second port set comprises a similarity value between a data transmit rate of one of the two ports and a data receive rate of the other one of the two ports.

3. The method according to claim 2, wherein the similarity algorithm is an average deviation algorithm, correspondingly, the acquiring a similarity value between state information of two ports comprised in all the links in the link set of each port in the second port set according to a similarity algorithm and state information of each port in the second port set comprises:
    acquiring an average deviation between the data transmit rate of one of the two ports comprised in all the links in the link set of each port, and the data receive rate of the other one of the two ports according to the average deviation algorithm; and acquiring the similarity value according to the following conversion formula between the average deviation and the similarity value; wherein the conversion formula comprises:

$$r = \begin{cases} K/a & a>0, \ K>0 \text{ and } r<A \\ A & a=0, \ A>0 \end{cases}$$

wherein r represents the similarity value, a represents the average deviation, and both A and K are preset values.

4. The method according to claim 2, wherein the similarity algorithm is a Pearson correlation coefficient algorithm, a least square algorithm, or a Dynamic Time Warping (DTW) algorithm, correspondingly, the acquiring a similarity value between state information of two ports comprised in all the links in the link set of each port in the second port set according to a similarity algorithm and state information of each port in the second port set comprises:
acquiring the similarity value between the data transmit rate of one of the two ports comprised in all the links in the link set of each port, and the data receive rate of the other one of the two ports according to the state information of each port and the Pearson correlation coefficient algorithm, the least square algorithm, or the Dynamic Time Warping (DTW) algorithm.

5. The method according to claim 1, wherein the operation further comprises: after retaining the link with a maximum similarity value in the at least two links and deleting the rest of links,
selecting a link whose similarity value is greater than a preset threshold.

6. A device for discovering a network topology, the device comprising:
at least one processor and a memory, wherein the memory is configured to store computer readable program codes and the at least one processor is configured to execute the computer readable program codes to acquire a network topology of a to-be-analyzed network by provide at least the following operations:
collect state information of all ports of a network element in the to-be-analyzed network, and if there is a port of all the ports whose state is normally-closed, delete the port in the normally-closed state from a first port set comprising all the ports to obtain a second port set, wherein if there is no port of all the ports whose state is normally-closed, the first port set is equal to the second port set;
obtain a link set of each port in the second port set by using the following method:
selecting one port in the second port set as a port of a link comprising two ports,
selecting all ports except the selected port as the other port of the link to obtain all links corresponding to the selected port, and
setting a set comprising all the links as a link set of the selected port, wherein the link is a link;
acquire a similarity value between state information of two ports comprised in all the links in the link set of each port in the second port set according to a similarity algorithm and state information of each port in the second port set;
acquire a link with a maximum similarity value in the link set of each port in the second port set as a candidate link of each port in the second port set; and
acquire a network topology of the to-be-analyzed network according to the candidate link of each port in the second port set, including:
obtaining a link set of the to-be-analyzed network by performing an operation on a candidate link set comprising the candidate link of each port in the second port set, and the operation comprises:
combining same links in the candidate link set,
setting a minimum one of all similarity values of multiple same links as a similarity value of the link retained after the combination, wherein the same links are at least two links comprising two ports, both of which are the same, and
for at least two links of which only one port is the same, retaining a link with a maximum similarity value in the at least two links, and deleting the rest of links; and
acquiring the network topology of the to-be-analyzed network according to each link in the link set of the to-be-analyzed network.

7. The device according to claim 6, wherein the state information of a port comprises:
a data transmit rate of the port in each statistic period, and a data receive rate of the port in each statistic period; and
the similarity value between the state information of the two ports comprised in all the links in the link set of each port in the second port set comprises a similarity value between a data transmit rate of one of the two ports and a data receive rate of the other one of the two ports.

8. The device according to claim 7, wherein the similarity algorithm is an average deviation algorithm, and the at least one processor is configured to execute the computer readable program codes to acquire a similarity value between state information of two ports in each of the links in the link set of each port in the second port set according to a similarity algorithm and state information of each port in the second port set by:
acquiring an average deviation between the data transmit rate of one of the two ports comprised in all the links in the link set of each port, and the data receive rate of the other one of the two ports according to the average deviation algorithm; and
acquiring the similarity value according to the following conversion formula between the average deviation and the similarity value; wherein the conversion formula comprises:

$$r = \begin{cases} K/a & a>0, \ K>0 \text{ and } r<A \\ A & a=0, \ A>0 \end{cases}$$

wherein r represents the similarity value, a represents the average deviation, and both A and K are preset values.

9. The device according to claim 7, wherein the similarity algorithm is a Pearson correlation coefficient algorithm, a least square algorithm, or a Dynamic Time Warping (DTW) algorithm, and the at least one processor is configured to execute the computer readable program codes to acquire a similarity value between state information of two ports comprised in all the links in the link set of each port in the second port set according to a similarity algorithm and state information of each port in the second port set by:
acquiring the similarity value between the data transmit rate of one of the two ports comprised in all the links in the link set of each port, and the data receive rate of the other one of the two ports according to the state information of each port and the Pearson correlation coefficient algorithm, the least square algorithm, or the Dynamic Time Warping (DTW) algorithm.

10. The device according to claim 6, wherein the operation further comprises:

after retaining a link with a maximum similarity value in the at least two links and deleting the rest of links, selecting a link whose similarity value is greater than a second preset threshold.

\* \* \* \* \*